Jan. 13, 1925.
C. L. VORESS ET AL
1,522,848
METHOD FOR TESTING GAS MIXTURES
Filed May 2, 1924
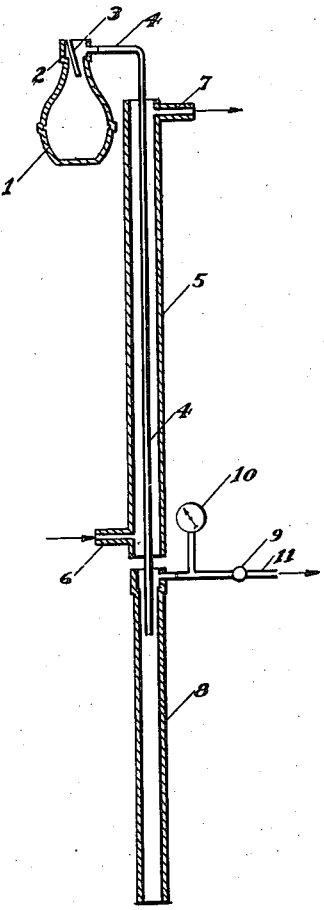
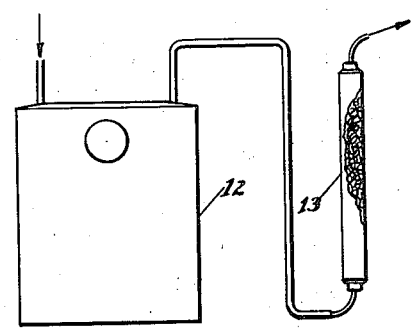
FIG.1.
FIG. 2.
CLYDE L. VORESS
VERNON C. CANTER
ROBERT W. SKOOG
  INVENTORS
BY *Junge A. Prevost*
ATTORNEY Patented Jan. 13, 1925.

1,522,848

UNITED STATES PATENT OFFICE.

CLYDE LENNARD VORESS, VERNON CHARLES CANTER, AND ROBERT WALFRED SKOOG, OF CHARLESTON, WEST VIRGINIA, ASSIGNORS TO GASOLINE RECOVERY CORPORATION, A CORPORATION OF DELAWARE.

METHOD FOR TESTING GAS MIXTURES.

Application filed May 2, 1924. Serial No. 710,637.

*To all whom it may concern:*

Be it known that we, CLYDE L. VORESS, VERNON C. CANTER, and ROBERT W. SKOOG, citizens of the United States, residing at Charleston, in the county of Kanawha and State of West Virginia, have invented certain new and useful Improvements in Methods for Testing Gas Mixtures; and we do hereby declare the following to be a full, clear, and exact description of the invention, such as will enable others skilled in the art to which it appertains to make and use the same.

This invention relates to an improved method of making tests to determine the proportion to which one vapor or series of vapors may be present in a mixture of vapors. It relates more specifically to an improved method for determining the extent to which vapors of gasoline, naphtha, kerosene, benzol, toluol, alcohol, ether, acetone, amyl acetate, ammonia, acetylene, or any other substances which might be amenable to determination by this process, may be present in vapor mixture. It relates further to an improved testing method which will recover such vapors as named above in volume sufficiently large that other tests may be conducted on the condensed recovered vapors. It also relates to an improved apparatus suitable for carrying out the purposes enumerated.

For the purpose of describing this invention to the public, we will confine our description of the invention to its application in the determination of the gasoline content of natural gas, although we do not in any way confine our invention to this particular use.

Patent No. 1,420,613 issued to C. L. Voress and V. C. Canter, two of the applicants herein named, among other things disclosed a commercial process for the recovery of gasoline from natural gas. The process consists in displacing absorbed vapors by condensed distilling vapors at a temperature higher than the temperature at which the absorbed vapors were absorbed, then displacing the distilling vapors by lighter vapors for the most part at a temperature lower than that at which the distilling vapors were absorbed and finally displacing the lighter vapors by heavier vapors at a temperature lower than the temperature at which the distilling vapors were absorbed.

It is often desirable to make preliminary tests of a natural gas supply before constructing a plant, with an apparatus which is much less elaborate, one that can be transported easily from place to place. Prior to the present invention, the determination of the gasoline content of natural gas has been carried out in a number of ways, chiefly by compression and refrigeration, by absorption and recovery from an oil or liquid menstrum, or absorption and recovery from a solid absorbent. By the latter method, prior to the present invention, natural gas vapors were passed through tubes containing such solid absorbents as activated carbon, silica gel, iron gel, etc., and subsequently the vapors were removed from the absorbent by the application of heat, applied either directly through steam or through some high boiling liquid placed in direct contact with the absorbent. As the vapors were liberated from the absorbent they were condensed at practically atmospheric pressure in a condenser surrounded by cooling water. This cooling water is generally kept at a temperature of approximately 32° F. by means of cracked ice. For a description of this process see Patent No. 1,455,263 issued to George G. Oberfell on May 15th, 1923.

Any experimental method for determining gasoline content of natural gas should give an accurate indication of what might be expected if a commercial plant were constructed to recover the gasoline. It is a well known fact among scientific men that any testing method, to be of maximum value, must be such that all factors which are to be encountered in the commercial plant can be accurately forecast by the testing method. Now the following disadvantages are present in the old testing method:

1. No attempt is made in the testing method to duplicate the cooling water temperatures to be encountered in the commercial plant.

2. No attempt is made in the testing method to duplicate the pressures under which the condensation takes place in the commercial plant.

3. No attempt is made to duplicate the saturation and, therefore, to secure the same "selective absorption" by the testing method that is secured by the commercial plant.

4. No attempt has been made in the old process of testing to establish a uniform rate of distillation comparable to commercial plant operation.

5. No attempt has been made in the old method of testing to meet commercial plant conditions as regards gravity and vapor tension of the product.

6. From a utility standpoint the old method has a number of limitations; for instance, it cannot be used in a field where ice is not available.

All of these factors are given careful consideration in the novel method and apparatus hereinafter described in detail, illustrated in the accompanying drawing, and more particularly set forth in the appended claims.

Referring to the accompanying drawing;

Fig. 1 is a side view partly in section of a meter and an absorber.

Fig. 2 is a diagrammatic view of the main part of the testing apparatus.

In Figure 1;

12 may be either a positive or orifice gas meter.

13 is a tube containing solid absorbent.

In Figure 2;

1 is a retort.

2 is any gas-tight mechanical means of attaching the retort to the condenser.

3 is a thermometer well.

4 is the inner tube of a condenser.

5 is the outer shell of the condenser.

6 is a fluid inlet to the outer shell of the condenser.

7 is a fluid outlet to the outer shell of the condenser.

8 is a condensate receiving tube.

9 is a relief valve hand operated.

10 is a pressure gauge.

11 is an outlet tube from the condensate tube.

The method of operation consists in measuring a predetermined quantity of gas through the meter 12 and allowing it to flow in direct contact with the solid absorbent in tube 13. At this point it may be stated that the amount of gas to be passed through tube 13 is determined by the operator from a knowledge of the quality of the gasoline which it is desired that the commercial plant produce, together with a knowledge of the gravity of the gas, field location, and such other knowledge as may be available. We have learned from commercial plant experience that the saturation that may be carried on the absorbent varies with the quality of the gasoline to be recovered. After the sample is taken, it is placed in the retort 1 and sufficient high-boiling liquid placed over it to thoroughly saturate it. Valve 9 is closed and water of a temperature corresponding to that which is to be used in the commercial plant is passed through the condenser and out tube 7. The thermometer is placed in thermometer well 3. Heat is then applied to retort 1 very gently at first until the pressure in the entire system, that is, through tube 4, condensate tube 8, and up to valve 9, is equal to that which is to be carried in the commercial plant system. This pressure is shown by gauge 10. As soon as this pressure is reached, valve 9 is slightly opened and so regulated by hand that uncondensed vapors escape therefrom slowly and the flame under retort 1 is so varied throughout the length of distillation that sufficient vapors are driven from the solid absorbent to maintain the predetermined pressure throughout the system as shown by gauge 10. All vapors condensing in tube 4 drip into condensate tube 8 where they are retained until the end of the distillation. They are then measured, the gravity and vapor tension of the product taken, and such other tests on the condensate as may be desirable are made by the operator. If a first test shows a higher vapor tension and gravity than that desired in the commercial plant, the amount of gas passed through the absorbent is increased in a second test or vice versa, and the first test discarded.

By the use of this apparatus and process the operator is enabled to make direct comparisons between the test method results and commercial plant results because of the five advantages already enumerated: First, comparable saturations; second, comparable rates of distillation; third, comparable temperatures of condensation; fourth, comparable pressure during condensation; fifth, comparable quality of product.

What we claim and desire to secure by Letters Patent is:—

1. A testing process consisting in absorbing a portion of a measured volume of vapor mixture in a solid absorbent, later distilling the absorbed vapors therefrom by replacing over the absorbent a high boiling point liquid and applying heat thereto at a rate which will maintain a given pressure in the condenser system and condensing a portion of the vapors distilled therefrom in a water cooled condenser, wherein the water for cooling is maintained at the temperature of that available for commercial plant practice.

2. A testing method consisting in selectively absorbing a portion of a measured quantity of gas mixture in a solid absorbent, later distilling the absorbed vapors therefrom by placing said solid absorbent, together with a high boiling liquid, in a distilling retort and securely attaching said retort to a gas-tight closed condenser and collecting system, applying heat to the retort, and heating slowly until a predetermined pressure has been created throughout the system by the vapors distilled from the solid absorbent, passing cooling water in contact with a portion of the closed system to continuously condense a portion of the distilled vapors, regulating a relief valve so that the uncondensed vapors slowly escape, maintaining the heat around the retort thereafter so as to maintain the constant pressure on the system and collecting the condensed vapors in liquid form in a portion of the apparatus.

3. A testing method which consists in selectively absorbing a portion of a measured volume of vapor mixture in a solid absorbent, later placing the solid absorbent containing the absorbed vapors together with a liquid distilling agent in a closed retort attached to a vertical closed system made up of vapor conducting tubes, a portion of which are water cooled and a portion enlarged to receive condensed vapors, applying heat gently at first to the retort until a predetermined pressure has been created by the distilled vapors throughout the system, cooling a portion of the closed container to a temperature equal to that obtainable in commercial plant practice throughout the distillation, slightly opening a relief valve located beyond the cooling portion of the apparatus after the predetermined pressure has been reached so as to permit the escape of a limited portion of the uncondensed vapors and thereafter so regulating the heat being applied to the retort and the relief valve that the predetermined pressure is maintained throughout the distillation, and finally collecting the condensed material which has separated by gravity from the uncondensed vapors in the lower portion of the vertical apparatus.

4. A testing method which consists in passing a measured volume of vapor bearing gas, said volume being determined by a knowledge of the final product to be obtained, through a solid absorbent wherein a portion of the vapors are absorbed, later placing the solid absorbent together with a measured quantity of high boiling liquid in a vessel securely attached to a gas-tight system so arranged that a predetermined pressure may be built up by the distilled vapors and maintained throughout the system when heat is applied at a regulated rate to the solid absorbent, and also while cooling water at a temperature equal to that available for commercial plant practice is being circulated around a portion of the enclosed system, resulting in a continuous condensation of a portion of the distilled vapors and their collection in a portion of the apparatus in liquid form.

5. A testing method which consists in passing a measured volume of natural gas, said volume being determined by a knowledge of the quality of gasoline to be recovered therefrom, through activated charcoal wherein a portion of the gasoline vapors are absorbed, later placing the activated charcoal, together with a measured quantity of high boiling liquid, in a retort securely attached to a gas-tight system so arranged that a predetermined pressure may be built up by the distilled vapors and maintained throughout the system when heat is applied at a regulated rate to the activated charcoal and while cooling water at a temperature equal to that available for commercial gasoline plant practice is being circulated around a portion of the enclosed system, resulting in a continuous condensation of the portion of the gasoline vapors and the collection of the gasoline vapors in the apparatus in liquid form.

6. A testing method consisting in selectively absorbing a portion of the gasoline vapors from a measured volume of natural gas in activated charcoal, later distilling the absorbed gasoline vapors therefrom by placing said activated charcoal, together with a high boiling liquid, in a distilling retort and securely attaching said retort to a gas-tight closed condenser and collecting system, applying heat to the retort, and condensing slowly until a predetermined pressure has been created throughout the system by the gasoline vapors distilled from the activated charcoal, passing cooling water in contact with a portion of the closed system to continuously condense a portion of the distilled gasoline vapors, regulating a relief valve so that the uncondensed gasoline vapors slowly escape, maintaining the heat around the retort thereafter so as to maintain the constant pressure on the system and collecting the condensed gasoline vapors in liquid form in a portion of the apparatus.

7. A testing method which consists in selectively absorbing a portion of a measured volume of gasoline vapor mixture in activated charcoal, later placing the activated charcoal containing the absorbed gasoline vapors, together with a liquid distilling agent, in a closed retort attached to a vertical closed system made up of vapor conducting tubes, a portion of which are water cooled and a portion enlarged to receive condensed gasoline vapors, applying heat gently at first to the retort until a predetermined pressure has been created by the distilled gasoline vapors throughout the system, maintaining a temperature on a portion of the closed container equal to that obtainable in commercial plant practice throughout the distillation, slightly opening a relief valve located beyond the cooling portion of the apparatus after the predetermined pressure has been reached so as to permit the escape of a limited portion of the uncondensed vapors and thereafter so regulating the heat being applied to the retort and the relief valve that the predetermined pressure is maintained throughout the distillation, and finally collecting the condensed material which has separated by gravity from the uncondensed gasoline vapors in the lower portion of the vertical apparatus.

8. A distillation process to be used in a testing method which consists in placing a measured quantity of solid absorbent partially saturated with absorbed vapors, together with a high boiling liquid, in a distilling retort and securely attaching said retort to a gas-tight closed condenser and collection system, applying heat to the retort and contents slowly until a predetermined pressure has been created throughout the system by the vapors distilled from the solid absorbent, passing cooling water in contact with a portion of the closed system to continuously condense a portion of the distilled vapors, regulating a relief valve so that the uncondensed vapors slowly escape, maintaining the heat around the retort thereafter so as to maintain the constant pressure on the system and collecting the condensed vapors in liquid form in a portion of the apparatus.

9. A distilling process which consists in placing a high boiling liquid over a solid absorbent partially saturated with absorbed vapors and contained in a closed system, applying heat to the solid absorbent slowly until sufficient vapors have been driven from the absorbent to cause a predetermined pressure throughout the system and thereafter at such a rate as will maintain said pressure when a relief valve located near the opposite end of the apparatus is slightly opened to allow the escape of a portion of the trapped vapors, circulating cooling water of a temperature comparable to that available for commercial plant practice at a predetermined rate around a portion of the apparatus in such a way that a portion of the absorbed vapors are condensed and caught in liquid form in another portion of the apparatus.

In testimony whereof we affix our signatures.

CLYDE LENNARD VORESS.
VERNON CHARLES CANTER.
ROBERT WALFRED SKOOG.